AMOS W. THOMAS.

Improvement in Tournures.

No. 5,563. Reissued September 2, 1873.

Witnesses.

Wm. Morison

Wm. H. Morison

Inventor.

A. W. Thomas

5,563. TOURNURES. A. W. Thomas, Philadelphia, Pa. Patent No. 114,624, dated May 9, 1871; reissue No. 4,903, dated May 14, 1872. [Filed June 30, 1873.]

*To all whom it may concern:*

Be it known that I, AMOS W. THOMAS, of the city and county of Philadelphia and State of Pennsylvania, have invented certain new and useful Improvements in Tournures or Bustles, of which the following is a full, clear, and exact description, reference being had to the accompanying drawings, in which—

Figure 1:
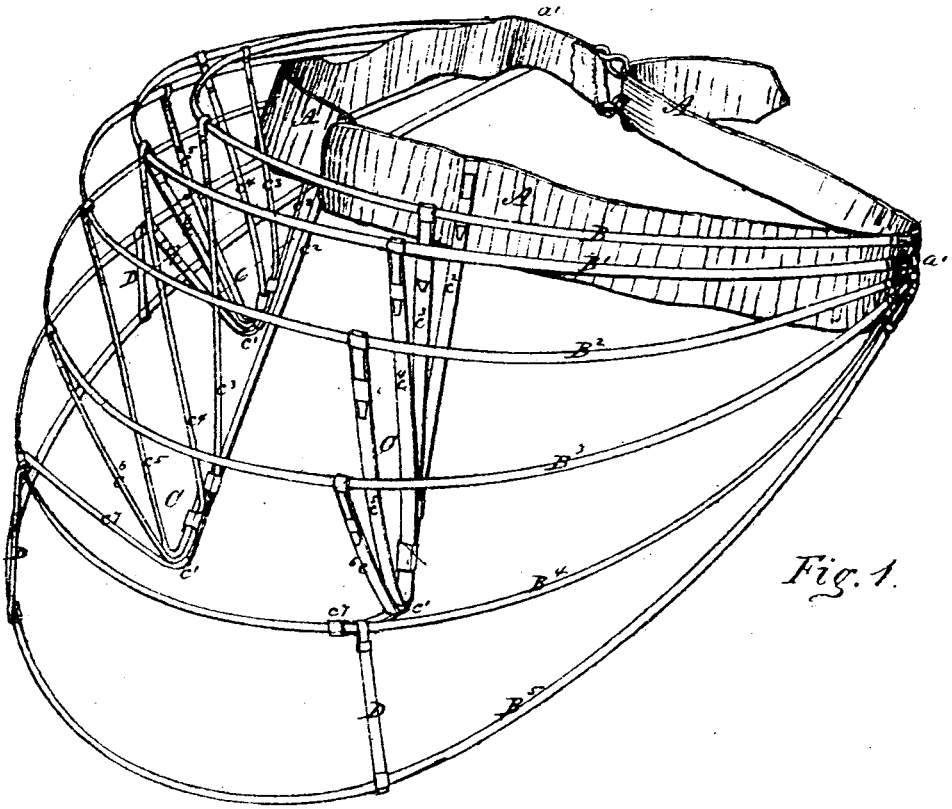
Figure 2:
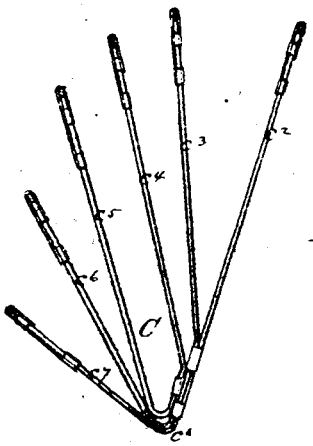

Figure 1 is a perspective view of the bustle, and Fig. 2 a side elevation of the standard.

The object of my invention is to provide a brace or standard which will transfer the weight of the skirt from the waistband in great measure to the hips, which will keep the bows a proper distance apart, support them beneath the superincumbent weight imposed upon them, and will at the same time allow them to yield easily to any outward lateral impact or pressure, and return elastically to their normal position when such lateral force is withdrawn. The nature of my invention consists in the construction of a standard or support which will allow the objects above stated to be attained; also, in the combination of said brace or standard with the bows of a bustle; and, further, with the waistband of such bustle, as hereinafter set forth.

Referring to the accompanying drawing, which illustrates my invention applied, A represents the waistband of a bustle, to which are securely fastened at their ends, as shown at *a*, the bows B, $B^1$, $B^2$, &c., said band being made of any suitable fabric, and the bows being composed of elastic steel wires. C represents the standard, formed of a series of wires or braces, $c^3$, $c^4$, &c., the outer ends of which are secured by any suitable fastening to the bows B, &c., the inner ends or base being designed to rest against or find a support upon the person of the wearer. For convenience and economy of construction, I form each pair of braces in a single standard, C, as $c^4$ and $c^5$, of one length or piece of wire, and I secure any two or more of these lengths or pieces together where bent by a metallic fastener or equivalent device, as at $c^1$.

I do not, however, limit myself to this method of forming the braces in pairs of single lengths or pieces of wire; nor to fastening the braces together at a single point where, as shown in the drawing, they converge, though I prefer this construction to any other.

In order to afford support or suspension to the base of the standard C, I suspend said base, as shown, from the waistband, and by using the brace $c^2$ for this purpose I further effect the keeping of said base at a certain fixed distance from the waistband.

For the reasons already stated I prefer to form this suspender and the lower brace $c^7$ of a single length or piece of wire, fastened to the other braces as shown; though I do not limit myself to this particular method of construction.

The bows of the bustle are supported by three of these standards—one of which is located midway between the ends of the bows and the other two on either side of the middle standard, as shown.

As a modification, the lowest bow, $B^5$, may be simply suspended from the bow $B^4$ by swinging bars D D.

The characteristic points of the standard, constructed as described, are: First, the standard or support has its base resting upon or against the person of the wearer, thus transferring the weight of the dress or skirt wholly or in great measure from the waistband to the hips, and from the front to the rear, thus securing ease and comfort. At the same time the standard is practically incompressible or unyielding in the direction of its length, or of a line from its outer extremity or point of attachment to the bows to its inner extremity or base, while it will yield, and permit the bows to yield easily to any lateral outward impact or pressure, and return elastically when such pressure or impact is withdrawn. Second, by the described aggregation of braces, each bow has a separate support, a single brace running from each bow to the common base. Hence any one bow may be compressed without affecting the position of any other bow; and thus, while the bows are connected, at their ends, to the waistband, they receive, from the braces, a support irrespective of direct connection with said band.

The bows are kept at a proper relative distance from each other or from the waist band by means of braces located at points between their ends, said braces not extending directly from bow to bow, differing, in this respect, from the modification D, wherein the hanger extends in a straight line from the bow $B^4$ to the bow $B^5$, having both ends connected to said bows, one to each. It must, of course, be understood, in this connection, that the bows are fixed at their ends so as to guard against forward movement; and the bows must be arranged so as to obtain the desired contour, which is effected, as seen in the drawing, by making them of unequal lengths. The braces have their outer extremities crossed by the bows to which they are secured, the advantage being that the end of the brace is thus kept flush with the bow to which it is attached, instead of extending beyond the same. The base of the standard is suspended from the waistband,—meaning by the term base, in this connection, the inner or lower part of the standard—or that portion which is designed to rest against the person of the wearer.

The weight of the skirt has a tendency to drag the bows downward, and, with them, the standard. To guard against this tendency is the object of suspending the base of the standard from the waistband; and if, at the same time, as shown, the suspender, for this purpose, be a continuation of, or similar to, the brace $c^7$, the base of the standard will be kept at a certain fixed distance from the waistband, whereby any tendency that might exist or be superinduced in the base to move toward said waistband is frustrated.

The braces forming the standard have, substantially, a common point of oscillation. By reference to Fig. 2, a side elevation, it will be observed that the several braces are, relatively, so arranged that, while their outer extremities are separated by the distance between the points to which they are attached, or the distance between the bows, their inner ends or bases are all together, or in substantially the same plane; and this characteristic is denoted by the term "flaring," *i. e.*, separating as they proceed toward the bows. The braces are formed of single lengths or pieces of wire, which are bent at or near their middle, thus effecting an economical result, as one piece of wire forms a pair of braces. The braces for the purpose of strengthening the same, and also in order to lessen the number of fastenings, are all secured together. The inward motion of the bows, under lateral impact or pressure, has the effect of more fully throwing the weight upon the braces in a longitudinal direction. Thus, it will be seen, that if the bows be compressed inwardly the braces will be in a more nearly vertical position than when occupying their normal position. The braces have a tendency to spring to their natural or normal position when released from any compression to which they may have been subjected. This is plainly shown in Fig. 2, representing the normal position of the standard, which allows the bows to yield easily to lateral impact or pressure, and forces out said bows or expands them elastically when said impact or pressure is withdrawn. The modification described explains itself, being the suspension of a bow in conjunction with bows supported or braced by the standard.

What I claim as my invention, and desire to secure by Letters Patent, is—

1. A bustle standard or support constructed with a base to rest against the person of the wearer, and with an outer extremity or brace arranged to sustain superincumbent weight exerted in the direction of its length without yielding in said direction, and at the same time capable of yielding to lateral or outward impact or pressure, substantially as described.

2. A series of braces, two or more, for sustaining superincumbent weight on a bustle, exerted in the direction of their length, each of which affords support to the bow to which it is attached, without direct connection of said brace with the waistband or other bows, substantially as described.

3. A series of braces, two or more, for sustaining superincumbent weight upon a bustle, arranged so that the bows, or waistband and bows, are kept at a proper relative distance apart, no one of said braces being connected at its outer extremity with more than a single bow, substantially as described.

4. A bustle standard or support for sustaining superincumbent weight exerted in the direction of its length, having its base resting upon or supported by the person of the wearer while its outer extremity is crossed by and secured to a bow, substantially as described.

5. A bustle standard or support for sustaining superincumbent weight exerted in the direction of its length, without yielding in said direction, having a base which rests against the person of the wearer, an outer extremity secured to the bow or bows, and a suspender proceeding from said base to the waistband, substantially as described.

6. A bustle standard or support for sustaining superincumbent weight, exerted in the direction of its length, having a base which rests against the person of the wearer, an outer extremity secured to the bow or bows, and a brace for keeping said base a fixed distance from the waistband, substantially as described.

7. A series of bustle-braces, two or more, forming a support for sustaining superincumbent weight, without yielding, in the direction of their length, said braces being made flaring, or so arranged relatively that, while their outer extremities are separated by the distance between the points to which said outer extremities are, respectively, attached, their opposite or inner extremities are in substantially the same plane, or are secured to a common base.

8. A bustle-standard for supporting the bows beneath superincumbent weight, having braces formed of single lengths or pieces of wire bent at or near their middle part, and having their ends secured by suitable means to the bows of a bustle, or to the waistband and a bow, substantially as described.

9. A bustle standard or support for the bows, having a series of braces, two or more, the extremity of each of which is attached substantially as described, and which are united where they come together.

10. A bustle support or brace for sustaining superincumbent weight, exerted in the direction of its length without yielding in such direction, having a base which rests against the person of the wearer, its outer extremity being secured to the bow, so constructed and arranged that when it or the bow to which its said outer extremity is attached is compressed inwardly or toward the person of the wearer, said brace will assume a more nearly vertical position than when sprung.

11. In a bustle, the upper bow or bows of which are supported by a standard whose base rests against the person of the wearer, substantially as described, the employment of an auxiliary bow, suspended by means of hangers or equivalents.

12. A bustle standard or support for sustaining superincumbent weight, composed of two or more braces, capable of yielding to outward impact or pressure to the same, and at the same time having a tendency to spring or return to their normal position when released from such pressure.

In testimony that I claim the foregoing I have hereto set my hand this 21st day of June, A. D. 1873.

AMOS W. THOMAS.

Witnesses:

GEO. C. SHELMERDINE,
M. DANL. CONNOLLY.